United States Patent [19]
Morikawa et al.

[11] Patent Number: 5,375,329
[45] Date of Patent: Dec. 27, 1994

[54] HEAVY DUTY SHEAR

[75] Inventors: Sumio Morikawa, Sakai; Nobuyuki Zakoji, Toyonaka, both of Japan

[73] Assignee: Ohyodo Diesel Co., Ltd., Osaka, Japan

[21] Appl. No.: 103,364

[22] Filed: Aug. 9, 1993

[51] Int. Cl.⁵ ............................................. B23P 19/00
[52] U.S. Cl. ..................................... 30/134; 241/101.7
[58] Field of Search ................ 30/134, 228; 241/101.7

[56] References Cited

U.S. PATENT DOCUMENTS

| | | |
|---|---|---|
| 4,519,135 | 5/1985 | LaBounty . |
| 4,847,921 | 2/1990 | Ramun ........................... 30/228 X |
| 5,146,683 | 9/1992 | Morikawa et al. . |
| 5,187,868 | 2/1993 | Hall ................................ 241/101.7 |
| 5,230,151 | 7/1993 | Kunzman et al. ............. 30/228 X |

FOREIGN PATENT DOCUMENTS 56-39273 11/1981 Japan .

*Primary Examiner*—Douglas D. Watts
*Attorney, Agent, or Firm*—Millen, White, Zelano & Branigan

[57] ABSTRACT

The object of the invention is to provide an attachment heavy duty shear of reduced weight. This shear has a single-row upper jaw and a single-row lower jaw, with the upper jaw being driven by a built-in hydraulic cylinder to open and close with respect to the lower jaw. The forward end of the lower jaw has a 7-configured guide member for precluding a lateral displacement of the upper jaw in shearing. This construction provides for reduced overall weight and positive grip and shearing.

3 Claims, 4 Drawing Sheets

HEAVY DUTY SHEAR

FIELD OF THE INVENTION

The present invention relates to a heavy duty shear for use in the demolition of buildings and other structures.

In the demolition of reinforced concrete buildings, scrap steel, chemical plant equipment made of alloy steel or the like, it is common practice to employ a heavy duty shear mounted on the arm of a power shovel. For example, the specification of U.S. Pat. No. 4,519,135 discloses the shear illustrated in FIG. 4. This shear comprises an upper jaw 4 and a lower jaw 1 juxtaposed in operative association about a pivotal shaft so that the upper jaw 4 may swing vertically to open and close with respect to the lower jaw 1. As a load is gripped between said upper jaw 4 and lower jaw 1 and the upper jaw 4 is closed by thrusting the piston rod of a hydraulic cylinder 5, the load is shorn by the jaws 1,4. To secure an expanded space between the upper jaw 4 and lower jaw 1 in an approximate center thereof, each of the jaws is recessed away from the other so as to prevent a forward slide of the gripped load. Moreover, the upper jaw 4 is constituted as a single-row element and the lower jaw 1 as an element formed in a couple of rows in such a manner that the forward part of the upper jaw 4 may swing down into the space between the two rows of lower jaw 1. The members of lower jaw 1 corresponding to said two rows are provided with a front cross member 6 interconnecting the forward ends of said lower jaw members to preclude a lateral expansion of the space between the rows. The lateral sides of upper and lower jaws 1,4 which are to face each other are provided with a plurality of cutters 7, 7a, 8, 9, respectively. Further disposed on the lateral sides of upper jaw 4 and lower jaw 1 which are opposite to the sides provided with said cutters 7, 7a, 8, 9 are wear plates 10 and 11, respectively, for precluding a lateral displacement of the upper jaw 4 in shearing.

However, since the lower jaw of this shear is formed in a couple of rows and the upper and lower jaws 1, 4 are provided with wear plates 10, 11, respectively, as mentioned above, the overall weight of the shear is great and, therefore, a fairly large power shovel is required for mounting of the shear.

Meanwhile, Japanese Tokkyo Kokai Koho S-56-49273 discloses a heavy duty shear comprising a cylinder housing dismountably secured to a power shovel arm through a swivel device and a pair of cutter bodies rotatably supported about a pivotal shaft on said cylinder housing, with each of said cutter bodies being formed in a single row.

The above shear comprising a couple of cutter bodies (equivalent to jaws) each constituted in a single row is lightweight and compact but the forward parts of the cutter bodies tend-to be displaced laterally in shearing a load.

SUMMARY OF THE INVENTION

Designed to overcome the above drawbacks, the present invention provides a heavy duty shear which can be rotatably mounted, as an attachment, at the free end of a construction machine arm, comprising a stationary lower jaw having a cutter means and a movable upper jaw having a cutter means, said lower jaw being a single-row member extending integrally from a cylinder housing which is disposed in a generally vertical position and housing a hydraulic cylinder, said upper jaw being a single-row member with its intermediate portion supported by a pivotal shaft mounted on said cylinder housing and its rear end connected to said hydraulic cylinder, said lower jaw having a front end element disposed in parallel with said pivotal shaft and further having an engaging member extending some distance rearwardly thereof in parallel with the cutter means of said lower jaw to present a configuration generally conforming to the numeral 7 in such a manner that the forward part of said upper jaw is free to swing down into a space between said cutter and engaging member, with the inner lateral side of said lower jaw being defined by a smooth curved plane conjoining its inner forward end and its rear portion adjoining to said cylinder housing.

The construction of the shear according to the present invention is now described in further detail, reference being had to the accompanying drawings.

BRIEF DESCRIPTION OF THE DRAWINGS

It should be understood that in all views the like numerals are used to designate the like or equivalent parts.

DETAILED DESCRIPTION OF THE PREFERRED EMBODIMENT

Figure 1:
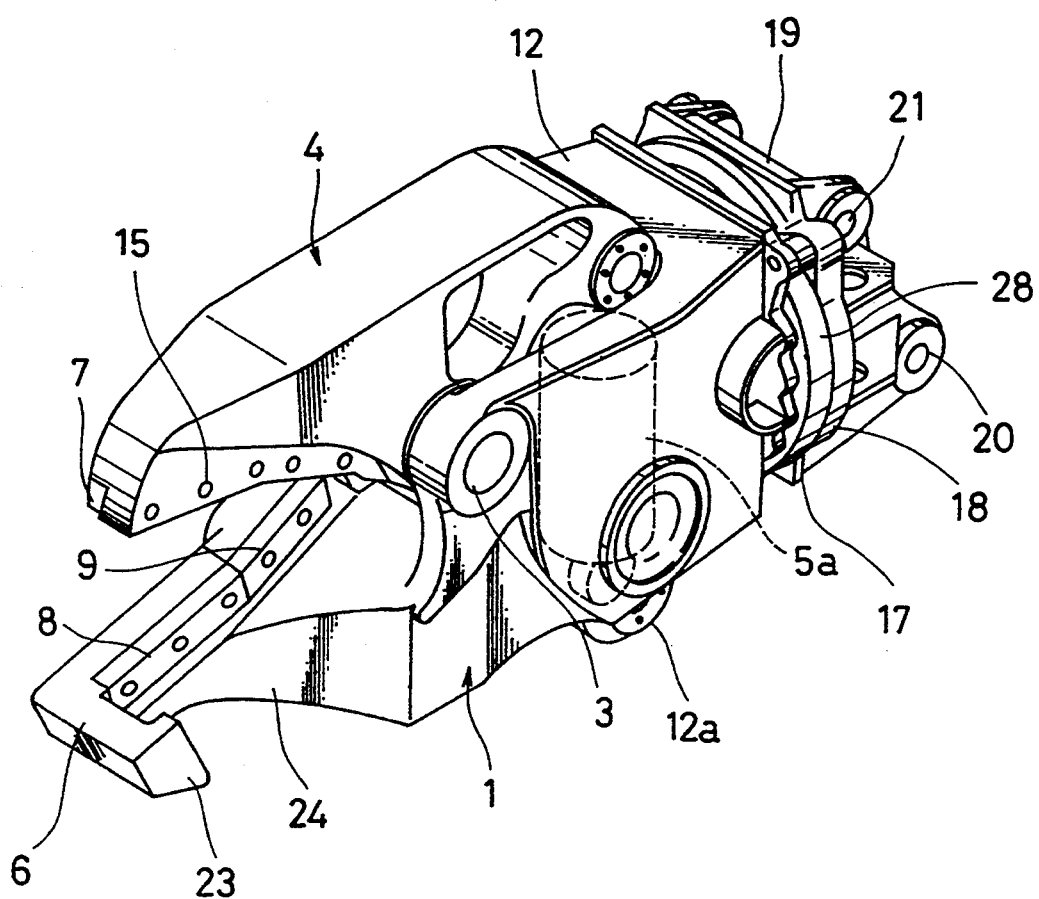
FIG. 1 is a perspective view showing an embodiment of the invention.
Figure 2:
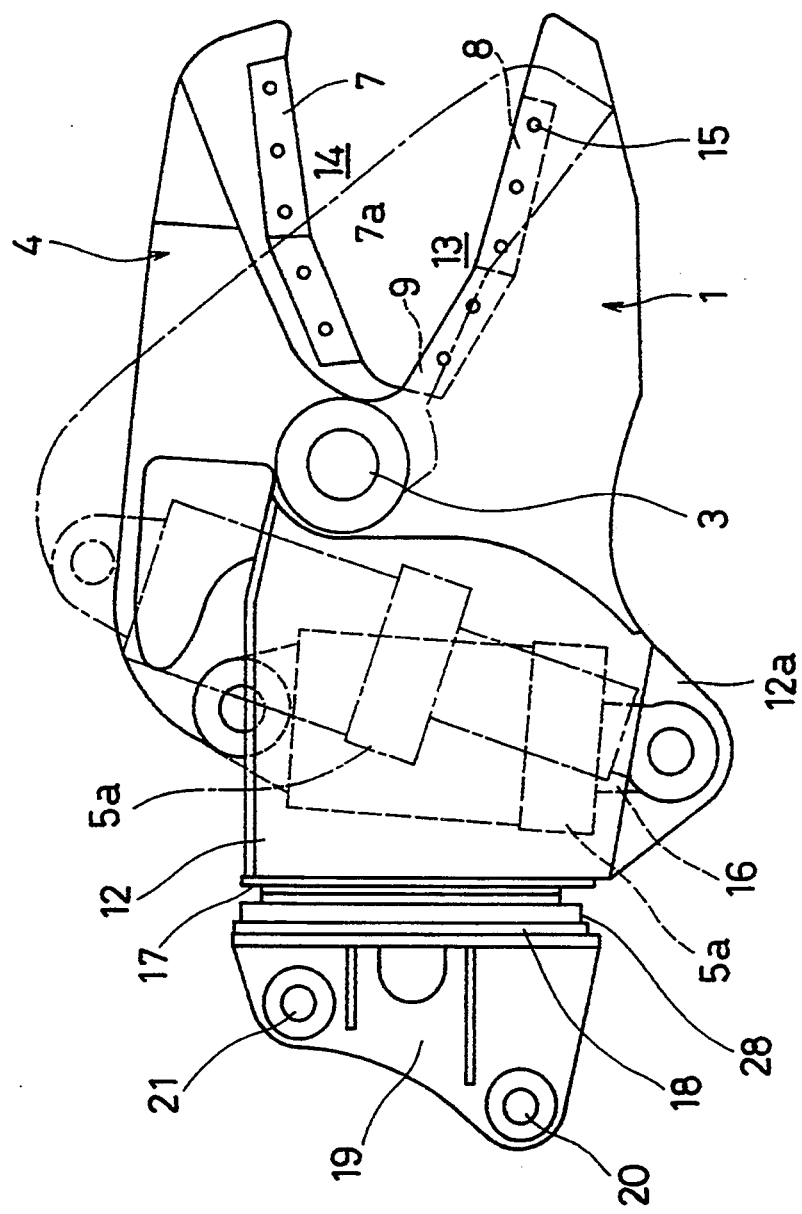
FIG. 2 is a side elevation view of the embodiment shown in FIG. 1.

The illustrated embodiment is particularly suited for use as a heavy duty shear mounted, as an attachment, on the free end of the arm of a construction machine, typically a power shovel. It is also suited as a specialty demolishing equipment for chemical plant pipelines, motor vehicles, railroad coaches and so on. The shear of the invention preferably weighs about 3800 kg and has a front opening about 600 mm wide and a cutter length of about 800 mm.

The shear according to this embodiment has a built-in hydraulic cylinder disposed in a generally vertical position for opening and closing the jaws. Moreover, its upper and lower jaws are formed each in a single row to realize a reduced overall weight and insure a smooth rotation with respect to the power shovel arm.

As illustrated, a lower jaw 1 extends integrally from a cylinder housing 12, while an upper jaw 4 is rotatably supported, in an approximate center, by a pivotal shaft 3 mounted on said cylinder housing 12 in such a manner that it is free to swing in vertical directions to open and close with respect to the lower jaw 1. As represented in side elevation, the lower jaw 1 has an intermediate recess 13 along its length extending from said pivotal shaft 3 toward its forward end and the upper jaw 4 also has an intermediate recess 14 corresponding to said recess 13 of lower jaw 1. Thus, these recesses 13, 14 of the upper and lower jaws 4, 1 constitute, therebetween, a free space which serves to prevent a forward slide of the gripped load.

The side of the lower jaw 1 which confronts the upper jaw 4 has cutters 8, 9 removably secured thereto, along said recess 13, by bolts 15.

The side of said upper jaw 4 which confronts the lower jaw 1 has cutters 7, 7a removably secured thereto, along said recess 14, by bolts 7, 7a.

The cutter 9 of lower jaw 1 and the cutter 7a of upper jaw 4 form a shear angle between them. When a mild steel load is shorn at a shear angle of less than 55°, the load does not slide forward.

The above-mentioned cylinder housing 12 is formed with a cylinder boss 12a at its bottom and the end of a rod 16 of a hydraulic cylinder 5a is rotatably supported by the boss 12a. This hydraulic cylinder 5a is disposed in a generally vertical position within the cylinder housing 12 and connected to the rear portion of said upper jaw 4. Therefore, when the hydraulic cylinder 5a is actuated, the upper jaw 4 is rotated to open or close with respect to the lower jaw 1. This arrangement also is conducive to the compact design of the whole shear.

Disposed on the rear face of the cylinder housing 12 is an assembly of a swing end plate 17 and a mounting end plate 18. This swing end plate 17 is rigidly secured to said rear face of cylinder housing 12, while the mounting end plate 18 is rigidly secured to a bracket 19. This bracket 19 is provided with an arm pin 20 for connection to the arm of a power shovel (not shown) and a cylinder pin 21 for connection to a booming hydraulic cylinder (not shown) disposed in parallel with the power shovel arm.

The above-mentioned swing end plate 17 carries a bearing 28 having an internal gear and said mounting end plate 18 has, as built therein, a hydraulic motor equipped with a pinion (not shown) or a swing brake device having a pinion and a swivel joint for free rotation.

Therefore, as the internal gear is rotated by the pinion directly coupled to the hydraulic motor, the swing end plate 20 is swung to allow the whole shear to rotate through 360° with respect to the power shovel arm.

In this embodiment, the following lateral stop means is provided to preclude a lateral displacement of the upper jaw 4.

Thus, the forward end of the lower jaw 1 has a front element 6 disposed in parallel with the pivotal shaft 3 and extending beyound the lateral width of the forward end of the upper jaw 4 and this front element 6 is formed with a short rearwardly extending engaging member 23 in parallel with the cutter 8 of the lower jaw 1. Thus, the lower jaw 1 is generally configured in the manner of the numeral 7 in plan view so that the upper jaw 4 is prevented by the engaging member 23 against lateral displacement.

The lower jaw 1 is configured, in plan view, in such a manner that the side of its base and the forward inner side thereof are conjoined by a smooth gently curved surface 24. Moreover, the forward side of said front element 6 is provided with a projection (not shown) for free rotation.

Furthermore, the forward end of said front element 6 is chamfered at 25, 25 for reduced weight and the inner surface 22 of said front element 6 is inclined along a plane complementary to the forward end of the upper jaw 4.

Figure 3:
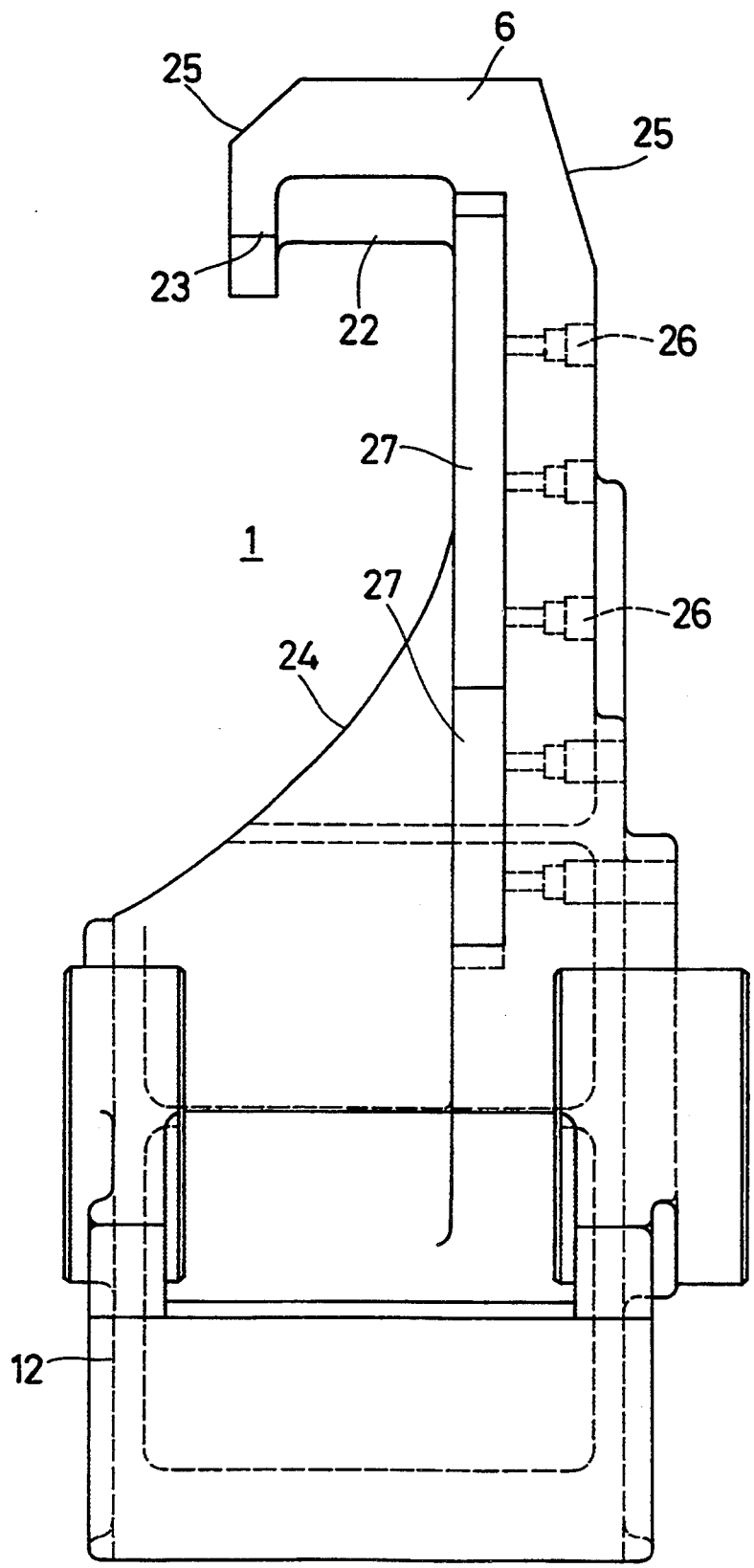
FIG. 3 is an elementary plan view of the embodiment shown in FIG. 1.
Figure 4:
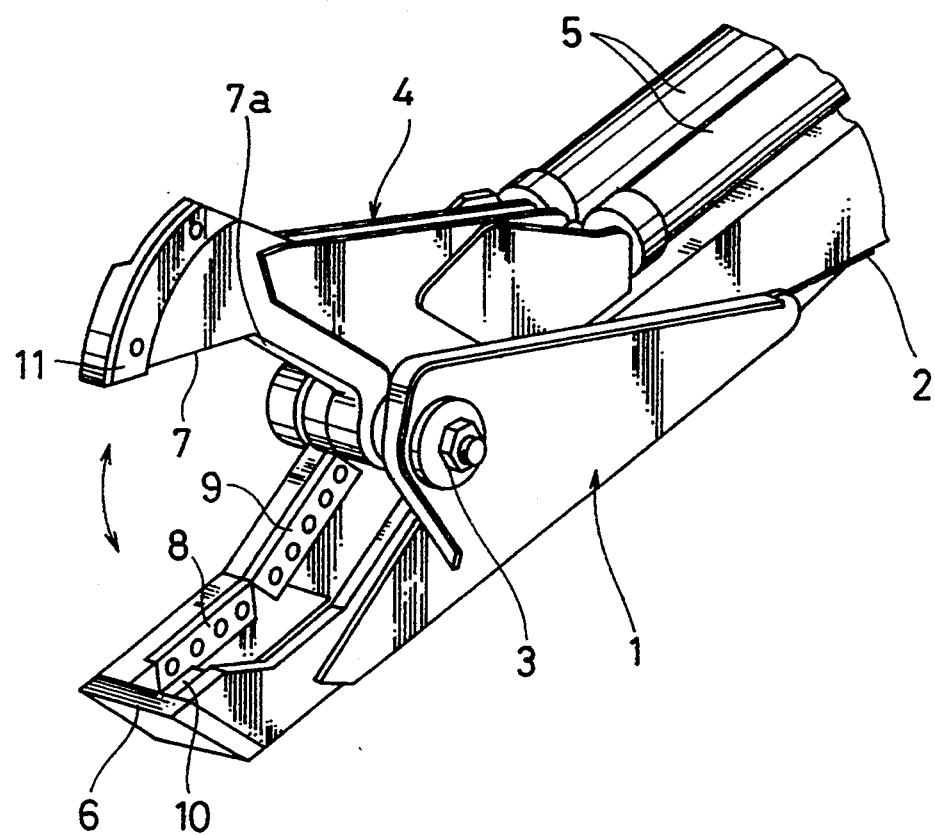
FIG. 4 is a schematic view showing the prior art shear.

In FIG. 3, a bolt hole for said bolt 15 is shown at 26 and a mounting recess for said cutters 8, 9 is shown at 27.

The operation of the shear according to this embodiment is now described. As the hydraulic cylinder 5a is actuated in a retracting direction, the upper jaw 4 opens with respect to the lower jaw 1. Then, as the shear as a whole is advanced to take in the load (not shown) and the hydraulic cylinder 5a is actuated in the protracting direction, the upper jaw 4 closes to shear the load. While the forward end of the upper jaw 4 tends to be displaced sideways at this moment, it is abutted against the engaging member 23 to preclude the lateral displacement.

EFFECT OF THE INVENTION

In accordance with the present invention, the stationary lower jaw is formed with a front end element having an engaging member extending some distance rearwardly in parallel with the cutter of the lower jaw, with the result that when the forward part of the upper jaw swings down into the space between said cutter and engaging member of the lower jaw to shear the load, displacement of the upper jaw in shearing is prevented by said engaging member.

Furthermore, since the curved surface of the lower jaw, which is formed in a single row, provides for a large space, the load can be easily gripped in the space. Moreover, the whole shear can be reduced in weight so that it can freely rotate at the tip of a construction machine arm.

What is claimed is:

1. A heavy duty shear for rotational mounting, as an attachment, at the free end of a construction machine arm, the heavy duty shear comprising a stationary lower jaw having a first cutter, a movable upper jaw having a second cutter, and a cylinder housing with a hydraulic cylinder therein, the lower jaw being a single-row member extending from the cylinder housing and the hydraulic cylinder extending transverse with respect to the lower jaw, the upper jaw being a single-row member with an intermediate portion supported by a pivotal shaft mounted on the cylinder housing, the upper jaw having a rear end portion connected to the hydraulic cylinder; and a forward portion with the second cutter thereon; the lower jaw having a front end element with an attached end and a free end, the front end element being in spaced relation to and extending parallel with respect to the pivotal shaft on which the upper jaw is pivoted; an engaging member to which the attached end of the front element is attached so as to be cantilevered with respect to the engaging member, the engaging member extending parallel to the cutters of the upper and lower jaws and cooperating with the front end element to define a space opening laterally of the engaging member in the direction in which the pivotal shaft and end element extend as well as opening perpendicular to the direction in which the pivotal shaft and end element extend, the movable upper jaw having a forward part which is received in the space when the jaws are closed.

2. The heavy duty shear of claim 1 further including a smooth, curved wall portion extending from the engaging member at a location spaced from the front end element; the smooth, curved wall portion facing the front end element with the space being defined by the front end element, the engaging portion and the smooth, curved wall portion.

3. The heavy duty shear of claim 2, wherein the smooth curved wall portion extends beyond the front end element in the direction of the lateral opening.

* * * * *